United States Patent
Jiang et al.

(10) Patent No.: US 9,600,372 B2
(45) Date of Patent: Mar. 21, 2017

(54) APPROACH FOR CONTROLLER AREA NETWORK BUS OFF HANDLING

(75) Inventors: Shengbing Jiang, Rochester Hills, MI (US); Mutasim A. Salman, Rochester Hills, MI (US); Michael A. Sowa, Clinton Township, MI (US); Katrina M. Schultz, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 108 days.

(21) Appl. No.: 14/425,289

(22) PCT Filed: Sep. 5, 2012

(86) PCT No.: PCT/US2012/053791
§ 371 (c)(1),
(2), (4) Date: Mar. 2, 2015

(87) PCT Pub. No.: WO2014/039035
PCT Pub. Date: Mar. 13, 2014

(65) Prior Publication Data
US 2015/0220401 A1    Aug. 6, 2015

(51) Int. Cl.
*G06F 11/14* (2006.01)
*H04L 12/40* (2006.01)
*H04L 1/24* (2006.01)
*G06F 11/30* (2006.01)
*H04L 1/00* (2006.01)

(52) U.S. Cl.
CPC ...... *G06F 11/1441* (2013.01); *G06F 11/3027* (2013.01); *H04L 1/24* (2013.01); *H04L 12/40013* (2013.01); *H04L 2001/0094* (2013.01); *H04L 2012/40215* (2013.01)

(58) Field of Classification Search
USPC ..................................... 714/4.2, 37
See application file for complete search history.

(56) References Cited

U.S. PATENT DOCUMENTS

| | | | | |
|---|---|---|---|---|
| 5,574,848 | A * | 11/1996 | Thomson | ......... H04L 12/40013 714/2 |
| 6,484,082 | B1 * | 11/2002 | Millsap | ............... H04L 12/4035 701/32.7 |
| 2008/0186870 | A1 * | 8/2008 | Butts | ................... H04L 41/0659 370/252 |
| 2008/0262708 | A1 * | 10/2008 | Yamaguchi | ........... F02D 41/266 701/112 |
| 2008/0273527 | A1 * | 11/2008 | Short | .................... H04J 3/0655 370/364 |

(Continued)

*Primary Examiner* — Kamini Patel
(74) *Attorney, Agent, or Firm* — John A. Miller; Miller IP Group, PLC (57) ABSTRACT

A system and method for determining when to reset a controller in response to a bus off state. The method includes determining that the controller has entered a first bus off state and immediately resetting the controller. The method further includes setting a reset timer in response to the controller being reset, determining whether the controller has entered a subsequent bus off state, and determining whether a reset time. The method immediately resets the controller in response to the subsequent bus off state if the reset time is greater than the first predetermined time interval, and resets the controller in response to the subsequent bus off state after a second predetermined time interval has elapsed if the reset time is less than the first predetermined time interval.

16 Claims, 4 Drawing Sheets

(56) References Cited

U.S. PATENT DOCUMENTS

| | | | |
|---|---|---|---|
| 2009/0183033 A1* | 7/2009 | Ando | H04L 43/0823 714/43 |
| 2010/0106320 A1* | 4/2010 | Grohman | F24F 11/0009 700/276 |
| 2010/0106322 A1* | 4/2010 | Grohman | F24F 11/006 700/276 |
| 2010/0106323 A1* | 4/2010 | Wallaert | G05B 15/02 700/276 |
| 2010/0106324 A1* | 4/2010 | Grohman | H04L 12/407 700/276 |
| 2010/0106325 A1* | 4/2010 | Grohman | G05B 15/02 700/276 |
| 2010/0106326 A1* | 4/2010 | Grohman | G05B 15/02 700/276 |
| 2010/0106787 A1* | 4/2010 | Grohman | G05B 15/02 709/206 |
| 2010/0107232 A1* | 4/2010 | Grohman | G05B 19/042 726/7 |
| 2010/0115364 A1* | 5/2010 | Grohman | H04L 12/413 714/748 |
| 2014/0149801 A1* | 5/2014 | Jiang | G06F 11/2005 714/43 |
| 2015/0082089 A1* | 3/2015 | Jiang | G06F 11/3048 714/25 |
| 2015/0082096 A1* | 3/2015 | Jiang | G06F 11/3006 714/37 |
| 2015/0113328 A1* | 4/2015 | Jiang | G06F 11/079 714/37 |
| 2015/0258999 A1* | 9/2015 | Jiang | B60W 50/029 701/29.2 |
| 2015/0312123 A1* | 10/2015 | Zhang | G06F 11/0745 709/224 |
| 2015/0346259 A1* | 12/2015 | Jiang | H04L 43/0811 324/538 |
| 2015/0346260 A1* | 12/2015 | Jiang | G06F 11/0739 324/538 |
| 2015/0347258 A1* | 12/2015 | Du | G06F 11/3027 714/4.2 |

* cited by examiner

APPROACH FOR CONTROLLER AREA NETWORK BUS OFF HANDLING

BACKGROUND OF THE INVENTION

Field of the Invention

This invention relates generally to a system and method for resetting a controller in response to a controller area network (CAN) bus off state and, more particularly, to a system and method for resetting an electronic control unit (ECU) on a vehicle in response to a CAN controller bus off state that includes differentiating between internal ECU faults and random external disturbances.

Discussion of the Related Art

Most modern vehicles include many electronic control units (ECUs) or controllers that control the operation of various vehicle systems, such as power train, climate control system, infotainment system, body systems, chassis systems, etc. Such controllers and ECUs require special purpose and designed software that allow them to perform their control functions. Many or all of the ECUs associated with a particular vehicle system are typically part of a distributed controller area (CAN) network that employs a CAN bus in electrical communication with the several ECUs that allows for the transmission of messages between the ECUs. Each ECU includes a hardware circuit known as a CAN controller that controls the transmission of messages onto the CAN bus and the receipt of messages from the CAN bus. The CAN controller provides signals to a host application layer on the ECU that includes the software that operates the ECU for the particular purpose.

Message errors occur when the CAN controller determines that a message has an improper header format or other improper configuration. Errors can occur as a result of random external disturbances, such as EMI pulses, or internal controller faults. If the CAN controller in an ECU receives a message from the CAN bus and determines that the message has an error, that CAN controller can corrupt the message so that it is not usable by other ECUs coupled to the bus. If a faulty CAN controller improperly corrupts a message because it thinks it has an error when it does not, then the other ECUs in the CAN network cannot use the message when they should be able to.

Each CAN controller in a CAN network typically operates in one of three states, namely, an error active state, an error passive state and a bus off state. When a CAN controller is in its active mode or error active state and providing messages to and receiving messages from the CAN bus, errors of the type as discussed above may occur where the transmission of data to or the reception of data from the bus has failed. The CAN controller may send active error flags onto the bus to corrupt messages on the bus as mentioned above. The CAN controller accumulates the errors over time and when the number of errors for the reception of messages, as accumulated by a receive error counter (REC) in the CAN controller, or when the number of errors for the transmission of messages, as accumulated by a transmission error counter (TEC) in the CAN controller, reaches a predetermined value, such as 127, the CAN controller enters the error passive state, where it cannot corrupt messages on the bus. During the error passive state, the TEC will continue to accumulate transmission errors and once a second count value has been reached, such as 255, the CAN controller enters a bus off state and is disconnected from the CAN bus. Thus, by putting the CAN controller in the error passive state once is has accumulated a predetermined number of errors, the CAN controller is prevented from corrupting messages that would otherwise be valid for the other ECUs in the network, and then when the transmission of errors reaches another predetermined value, the CAN controller is prevented from transmitting error messages onto the bus that would otherwise be acted on by other ECUs in the network.

The CAN controller notifies the application layer when the bus off state occurs. The application layer is programmed with a certain protocol that allows it to reset the CAN controller after a bus off state occurs so that the CAN controller can again become active to send and transmit messages on the CAN bus. Thus, the CAN controller remains in the bus off state until the application layer initiates the reset of the CAN controller to the error active state. Different CAN networks employ different types of bus off reset policies to determine how and when the application layer resets the CAN controller.

In one known bus off reset policy, referred to as an auto-reset policy, the application layer initiates the reset of the CAN controller immediately after the CAN controller enters the bus off state and the CAN controller returns to the error active state after it receives a predetermined number of recessive bits a predetermined number of times, such as 128 recessive bits 11 times. However, if the CAN controller itself is faulty and the application layer immediately resets the CAN controller, the CAN controller would repeatedly interrupt the normal vehicle control.

In another known bus off reset policy, referred to as a wait-then-reset policy, the application layer will wait some predetermined period of time after the bus off state occurs to give the CAN controller time to recover from the fault condition. However, as mentioned, there are certain CAN controller error conditions caused by external interferences, such as electromagnetic radiation, that are random and periodic and do not last for very long. If the bus off reset policy is to wait and then reset the CAN controller to the error active state, and the result of the error is an external disturbance, then the CAN controller will be offline for some period of time where the interference probably is still not causing problems. During this time, the particular CAN controller will not be able to put messages onto the bus, possibly effecting vehicle operation and performance. Therefore, a CAN controller that is waiting for a message from another CAN controller that is in the wait period for the bus off reset policy may set a diagnostic trouble code (DTC) that indicates that the CAN controller is not available to send messages.

In another known bus off reset policy, referred to as a frequency-limited-reset policy, it is required that the time between any two subsequent resets must be larger than a predetermined time interval. For this case, if a second bus off state occurs after the predetermined time interval from the reset of the first bus off state then the application layer immediately resets the CAN controller. However, for a faulty controller, too small of a time interval between the resets would result in the immediate reset of the CAN controller for a bus off state and the CAN controller would have no time to recover from the fault resulting in continuous interference of the normal communications on the bus, and too long of a time interval would result in unnecessary interruption of the CAN controller when not being connected to the bus. Analysis has shown that no appropriate time interval between bus off state and reset can satisfactorily address the above situations.

SUMMARY OF THE INVENTION

In accordance with the teachings of the present invention, a system and method are disclosed for determining when to reset a controller in response to a bus off state that occurs as a result of errors identified in messages transmitted on or received from a controller area network (CAN) bus, where the bus off state causes the controller to be disconnected from CAN bus. The method includes determining that the controller has entered a first bus off state and immediately resetting the controller in response to determining that the controller has entered the first bus off state. The method further includes setting a reset timer in response to the controller being reset, determining whether the controller has entered a subsequent bus off state after the controller has been reset, and determining whether a reset time from when the controller is reset until the subsequent bus off state is greater than a first predetermined time interval. The method immediately resets the controller in response to the subsequent bus off state if the reset time is greater than the first predetermined time interval, and resets the controller in response to the subsequent bus off state after a second predetermined time interval has elapsed if the reset time is less than the first predetermined time interval.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing a CAN controller bus off reset policy is merely exemplary in nature, and is in no way intended to limit the invention or its applications or uses. For example, the present invention has application for resetting CAN controllers in ECUs associated with a vehicle. However, as will be appreciated by those skilled in the art, the present invention will have application for other controllers.

Figure 1:
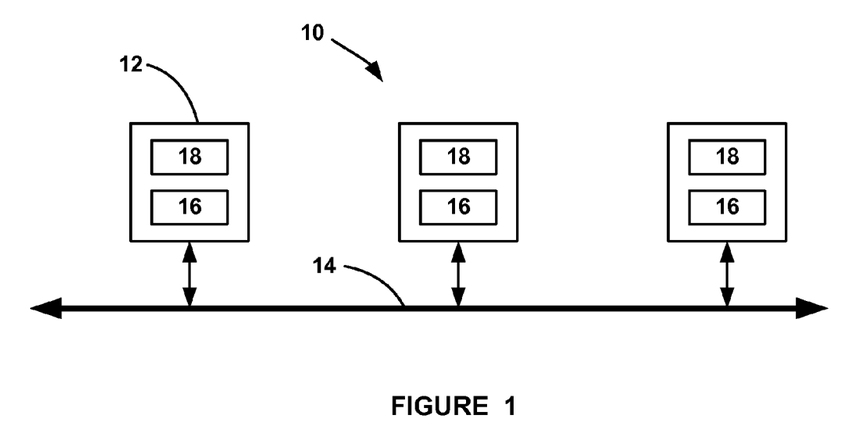
FIG. 1 is an illustration of a plurality of ECUs coupled to a CAN bus.

FIG. 1 is an illustration of a CAN network 10 including a plurality of ECUs 12 coupled to a CAN bus 14. The CAN network 10 is intended to be a general representation of any CAN network on a vehicle that includes any number of ECUs for any applicable vehicle system. Messages transmitted by and received from a particular ECU 12 are provided on the bus 14 to be received by and acted on by other of the ECUs 12 in the network 10 in a manner that is well understood by those skilled in the art. As discussed above, each ECU 12 includes a hardware chip referred to as a CAN controller 16 that controls the transmission of messages onto the CAN bus 14 and the receipt of messages from the CAN bus 14. The CAN controller 16 provides signals to a host application layer 18 on the ECU 12 that includes the software that operates the ECU 12 for the particular purpose. When the CAN controller 16 enters a bus off state, it notifies the host application layer 18 of that condition.

Figure 2:
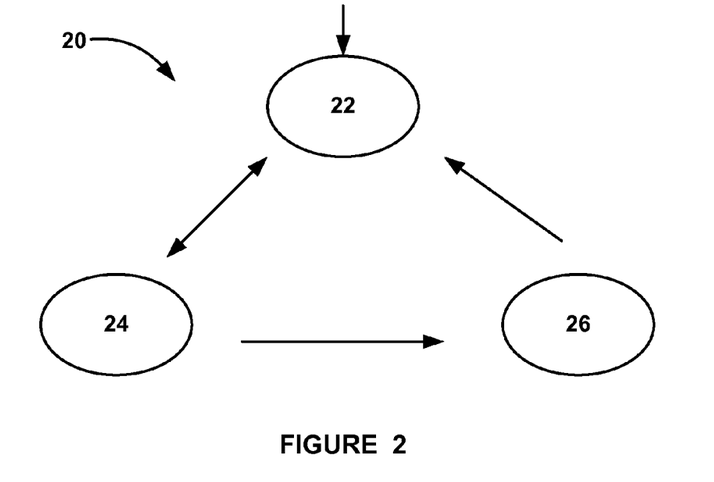
FIG. 2 is a state diagram showing the states of a CAN controller in the ECUs shown in FIG. 1.

FIG. 2 is a representation of a CAN controller state diagram 20 showing the CAN controller states referred to above. Particularly, the state diagram 20 shows an active error state 22, an error passive state 24 and a bus off state 26.

The present invention proposes a bus off reset policy that effectively differentiates between errors caused by external random disturbances and errors cause by internal controller faults. Analysis has shown that a bus off state caused by an internal controller fault is reached quickly, for example, less than 1 second, i.e., the TEC reaches the predetermined error count from TEC=0 after a reset to the error active state 22, and a bus off state caused by an external random disturbance is reached more slowly, for example, more than 100 seconds. To provide this differentiation, the present invention looks at the time from a first bus off state to a next bus off state, and if that time is greater than a predetermine calibratable time interval, the CAN controller determines that the errors are caused by an external disturbance, and if that time is less than or equal to the time interval, the CAN controller determines that the errors are caused by an internal controller fault. As discussed herein, if the bus off state is caused by an internal controller fault, then some reset time is desired to give the CAN controller 16 an opportunity to recover from the fault. However, if the bus off state is caused by an external disturbance, then the disturbance is typically very quick and the CAN controller 16 can be reset immediately.

For bus off states caused by an internal controller fault, it has been shown that the time from one bus off state reset, TEC=0, to the next bus off state 26 for a high speed CAN controller, for example, 500 Kb/s, is less than 10 seconds when the frame error rate is greater than 0.12 and less than 1 second when the frame error rate is greater than 0.21. It has also been shown that the time from one bus off state reset, TEC=0, to the next bus off state 26 for a low speed CAN controller, for example, 33.3 Kb/s, is less than 10 seconds when the frame error rate is greater than 0.25 and less than 1 second when the frame error rate is 0.7.

For bus off states caused by external disturbances in a high speed CAN controller, it has been shown that the time from one bus off state reset to the next bus off state 26 is more than 1300 seconds in a harsh EMI environment, including a bit error rate $10^3$. For a low speed CAN controller, the time from one bus off state reset to the next bus off state 26 is more than 19000 seconds in a harsh EMI environment.

The values given above are for the time from when the CAN controller 16 enters the active error state 22 to when it enters the bus off state 26. For those CAN controllers that also employ the error passive state 24, the same values can be calculated from the time between when the CAN controller 16 enters the error passive state 22 to when it enters the bus off state 26. Particularly, for bus off states caused by an internal controller fault, it has been shown that for a high speed CAN controller, the time between when the controller 16 enters the error passive state to when it enters the bus off state is typically less than 10 seconds when the frame error rate is greater than 0.11 and less than 1 second when the frame error rate is greater than 0.16. For low speed CAN controllers, it has been shown that the time between when the controller 16 enters the error passive state 24 to when it enters the bus off state 26 is less than 10 seconds when the frame error rate is greater than 0.18 and less than 1 second when the frame error rate is greater than 0.55.

For bus off states caused by external disturbances, it has been shown that for a high speed CAN controller, the time between when the controller 16 enters the error passive state 24 to when it enters the bus off state 26 is typically greater than 35 seconds in a harsh EMI environment and for a low speed CAN controller is typically greater than 510 seconds in a harsh EMI environment.

Based on the foregoing, when the bus off state 26 occurs in the CAN controller 16 as a result of the accumulation of errors as described, the CAN controller 16 reports the bus off state 26 to the application layer 18, which enters an interrupt routine that includes starting a timer to determine when the next bus off state occurs, and if that time is less than or equal to a calibratable time interval X, then the bus off state 26 can be assumed to be a result of errors caused by a faulty controller, and if that time is greater than the time interval X, then the bus off state 26 can be assumed to be a result of errors caused by external disturbances. If the time is less than the time interval X, then the application layer 18 can set a calibratable reset wait time interval Y before resetting the CAN controller 16 to allow the CAN controller 16 to recover from the fault. If the time is greater than the time interval X, then the application layer 18 can immediately reset the CAN controller 16. Both the time intervals X and Y are calibratable for low speed and high speed CAN controllers, for example, the time interval X can be 1 second for a high speed CAN controller and 10 seconds for a low speed CAN controller, and the time interval Y can be 100 ms for a high speed CAN controller and 1 second for a low speed CAN controller.

Figure 3:
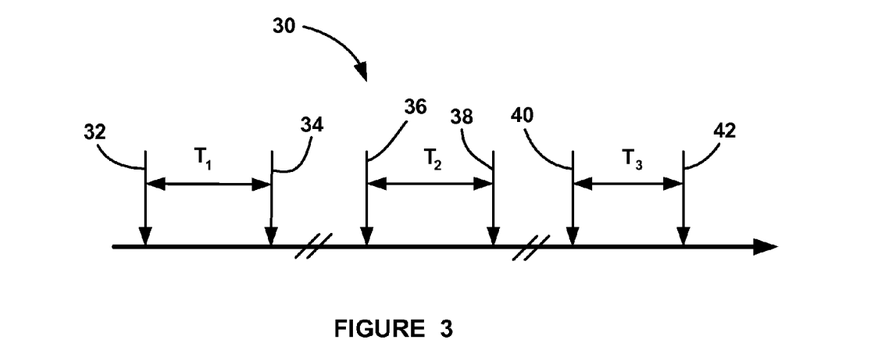
FIG. 3 is a time line showing a first solution for a bus off reset policy.

FIG. 3 is a timing diagram 30 illustrating a first solution bus off reset policy for a CAN controller that does not report an error passive state to the application layer 18. If the first bus off state 26 occurs at time 32, the CAN controller 16 is immediately reset and a timer is started. If the timer provides a time $T_1$ at time 34 when the next bus off state 26 occurs, the application layer 18 determines whether the time $T_1$ is greater than or less than the time interval X. If the time $T_1$ is greater than the time interval X, meaning the bus off state 26 occurred because of random disturbance, then the application layer 18 immediately resets the CAN controller 16, and if the time $T_1$ is less than or equal to the time interval X, meaning the bus off state 26 occurred because of a faulty controller, then the application layer 18 waits the time interval Y before it resets the CAN controller 16 to give the controller 16 time to recover from the fault. The same process is performed for times $T_2$ and $T_3$ associated with bus off reset time 36 and the next bus off state time 38 and the bus off reset time 40 and the next bus off state time 42, respectively.

The above described bus off reset policy has the disadvantage that since the first bus off state at time 32 is always treated as a an immediate reset even if it is a faulty controller, the faulty controller could be still be operating for the time $T_1$, for example, 1 second, before the next bus off state occurs when the time $T_1$ can be used to determine if the bus off state 26 was caused by a faulty controller or an external disturbance based on the time interval X, in which case time $T_1$ would be less than or equal to the time interval X since the bus off is caused by the faulty controller, and only after the second bus off at time 34 a wait-time is provided at its reset. As a result, the bus interference from the faulty ECU will continue for the time $T_1$ until the next bus off state 26 at the time 34. Thus, the bus interruption occurs for an additional 1 second beyond what would be desirable.

Figure 4:
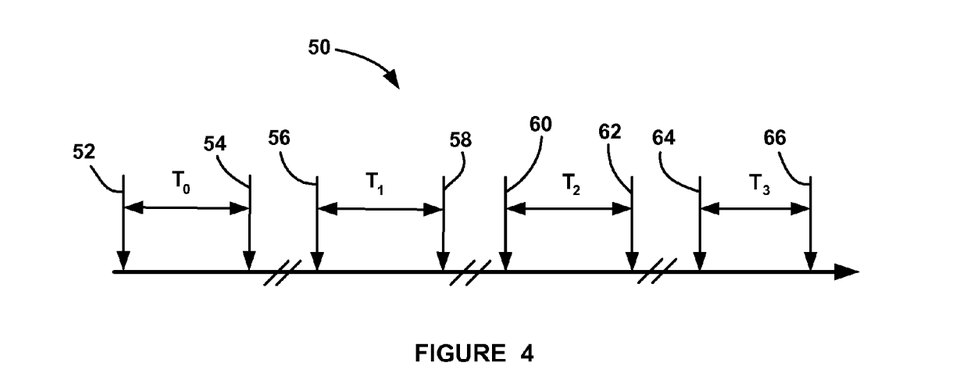
FIG. 4 is a time line showing a second solution for a bus off reset policy.

This disadvantage can be addressed by counting the time between when the error passive state 24 is reached and the bus off state 26 is reached, which is typically very quickly. This second solution bus off reset policy is illustrated by timing diagram 50 in FIG. 4 where a timer is started when the CAN controller 16 enters the first error passive state 24 before the first bus off state 26 occurs. The time $T_0$ from when the first error passive state 24 is entered at time 52 and the first bus off state 26 occurs at time 54 is compared to the time interval X to determine if the bus off state 26 is caused by a faulty controller or an external disturbance. If the bus off state 26 is caused by a faulty controller, then the time $T_0$ will be less than or equal to the time interval X, and the application layer 18 treats the bus off state 26 as an internal fault and resets the CAN controller 16 after the delay of the time interval Y. If the bus off state 26 was caused by an external disturbance, the time $T_0$ will be greater than the time interval X and the application layer 18 will immediately reset the CAN controller 16. The same process is performed for times $T_1$, $T_2$ and $T_3$ for error passive state time 56 and bus off state time 58, error passive state time 60 and bus off state time 62, and error passive state time 64 and bus off state time 66, respectively.

Thus, if the CAN controller 16 does report the error passive state 24 to the application layer 18, then the ECU 12 can use the second solution for its bus off reset policy, and if the CAN controller 16 does not report the error passive state 24 to the application layer 18, then the ECU 12 can use the first solution for its bus off reset policy.

For the first solution where the bus off state determination is based on the time from the last bus off reset, the performance is slightly reduced because the application layer 18 is unable to identify the first bus off state for a faulty ECU. However, there is no additional cost to the CAN controller 16 to report the error passive state 24. For the second solution, for the bus off state differentiation based on the time from the error passive state 24, the performance of the bus off reset policy is increased because of the correct identification of the first bus off for a faulty ECU, however, there is additional cost for the CAN controller 16 to report the error passive state 24.

Figure 5:
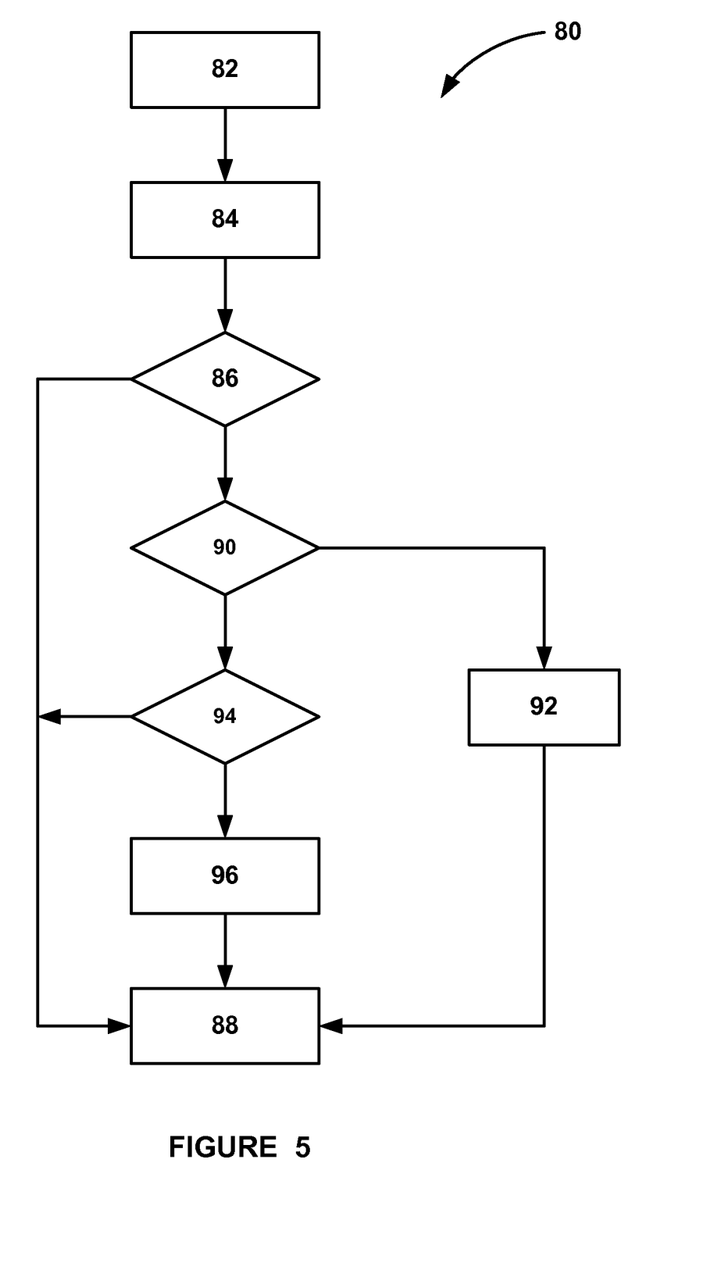
FIG. 5 is a flow chart diagram showing a process for implementing the bus off reset policy illustrated in FIG. 3.

FIG. 5 is a flow chart diagram 80 showing a process for providing the bus off reset policy set forth for the first solution discussed above as illustrated in FIG. 3. When the CAN controller 16 enters the bus off state it notifies the application layer 18 by a CAN interrupt routine that includes setting a bus off state flag indicating the bus off state 26. The algorithm in the application layer 18 running the CAN bus off handling algorithm periodically at a time period $T_a$, such as 10-20 milliseconds, which is less than the time intervals X and Y, to monitor the bus off state flag and perform the bus off reset policy for resetting the CAN controller 16 to the active error state 22. In this embodiment, the timers for the time intervals X and Y count down from their value to zero when they are started when the bus off state 26 is entered. Initially, both the timers for the time intervals X and Y are set to zero. When the algorithm enters the process when the time period $T_a$ has elapsed, the algorithm determines whether the timer for the time interval X is set to zero, and if not, decreases the timer for the time interval X by the time period $T_a$ at box 82, and determines whether the timer for the time interval Y is set to zero, and if not, decreases the timer for the time interval Y by the time period $T_a$ at box 84. Thus, if either or both of the timers for the time intervals X and Y are running when the process is initiated, they are decreased by the time period $T_a$ on their way to zero.

At decision diamond 86, the algorithm determines whether the bus off flag has been set to 1 meaning that a bus off state has occurred, and if not, the algorithm ends at box 88 to wait for the next time period $T_a$. If the bus off flag has been set to 1 at the decision diamond 86, then the algorithm determines whether the timer for the time interval X is equal to zero at decision diamond 90. When the reset of a bus off state 26 occurs, the timer for the time interval X is set and begins to count down in increments of $T_a$ from the time value X to zero to determine if the next bus off state 26 has occurred relative to the time. If the timer for the time interval X is not equal to zero, then the bus-off state 26 occurred before the end of the time interval X, here 1 second, meaning that the bus-off state 26 occurred because of a faulty ECU. In this situation, the timer for the time interval X is set to zero and the timer for the time interval Y is set to the time interval Y at box 92 to cause the controller 16 to be reset after the time interval Y expires, and the algorithm ends at the box 88.

If the timer for the time interval X is equal to zero at the decision diamond 90, meaning that the bus off state 26 occurred after the timer for the time interval X elapsed and the bus off state 26 is the result of random disturbances and the timer for the time interval Y for the wait-time of the reset is proceeding, the algorithm then determines whether the timer for the time interval Y is zero at decision diamond 94. If the timer for the time interval Y is not zero at the decision diamond 90, then the algorithm is still waiting for the wait-time to elapse for when it can be reset and the algorithm ends at the box 88. If the timer for the time interval Y is equal to zero at the decision diamond 94, meaning that the ECU 12 has been in the bus off state for the desired period of time to recover from the fault, the algorithm proceeds to box 96 to initiate the reset of the CAN controller 16 to the error active state 22, set the bus-off flag to zero and reset the timer for the time interval X to its time value, and the algorithm ends at the box 88.

Figure 6:
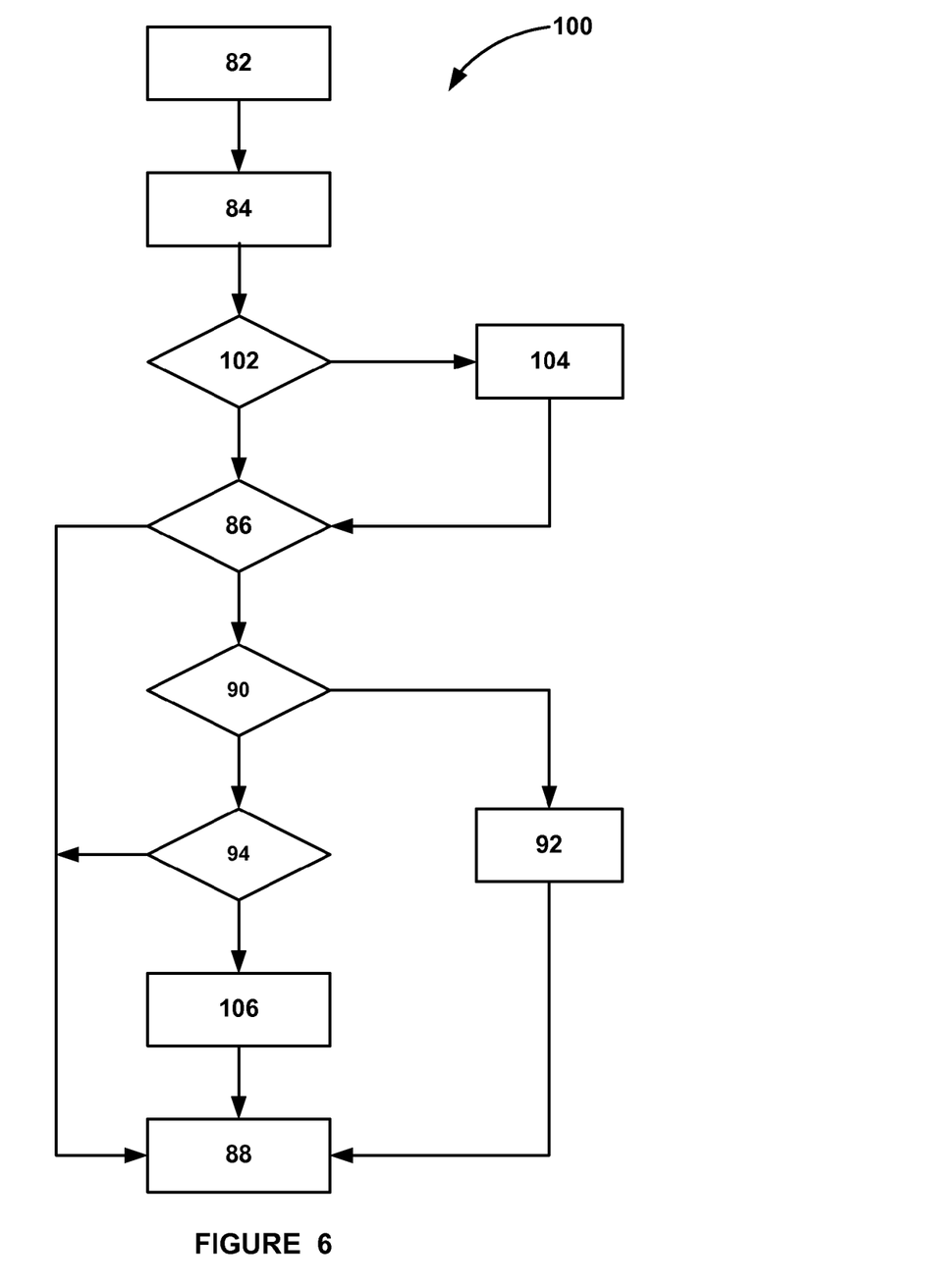
FIG. 6 is a flow chart diagram showing a process for implementing the bus off reset policy illustrated in FIG. 4.

FIG. 6 is a flow chart diagram 100 showing the operation for the bus off reset policy for the second solution discussed above with reference to FIG. 4, where like boxes to the flow chart diagram 80 have the same reference number. For this bus off reset policy, the interrupt routine sets both the bus off flag when the ECU 12 is in the bus off state 26 and an error passive state flag when the CAN controller 16 is in the error passive state 24. In this process, after the timers for the time intervals X and Y have been decreased by the period $T_a$, the algorithm determines whether the CAN controller 16 is in the error passive state 24 by determining if the error passive state flag has been set at decision diamond 102 before it determines whether the bus-off flag has been set to 1. If the error passive state 24 has not been entered at the decision diamond 102, then the algorithm proceeds directly to the decision diamond 86 to determine if the bus off state flag is set. However, if the error passive state 24 has been entered at the decision diamond 102, then the algorithm sets the timer for the time interval X to its value, here 1 second, at box 104 because the reset is based on the time from when the CAN controller 16 enters the error passive state 24. The algorithm also sets the error passive flag to zero at the box 104 before it proceeds to determining whether the bus-off flag has been set at the decision diamond 86. The CAN controller is reset and the bus off flag is set to zero at box 106, where the time interval X is not set at the box 106 when the CAN controller 16 is reset because it was reset at the box 104.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining when to reset a controller in response to a bus off state that occurs as a result of an accumulation of a first predetermined number of errors identified in messages transmitted on or received from a controller area network (CAN) bus, where the bus off state causes the controller to be disconnected from the CAN bus, said method comprising:
   determining that the controller has entered a first bus off state;
   immediately resetting the controller in response to determining that the controller has entered the first bus off state;
   setting a reset timer in response to the controller being reset;
   determining whether the controller has entered a subsequent bus off state after the controller has been reset;
   determining whether a reset time from a time at or after the controller is reset until the subsequent bus off state is greater than a first predetermined time interval;
   immediately resetting the controller in response to the subsequent bus off state if the reset time is greater than the first predetermined time interval; and
   resetting the controller after a second predetermined time interval has elapsed in response to the subsequent bus off state if the reset time is less than the first predetermined time interval.

2. The method according to claim 1 further comprising setting the reset timer in response to the controller being reset, determining whether the controller has entered another subsequent bus off state after the controller has been reset, determining whether the reset time from at or after the controller is reset until the subsequent bus off state is greater than the first predetermined time interval, immediately resetting the controller in response to the subsequent bus off state if the reset time is greater than the first predetermined time interval, and resetting the controller in response to the subsequent bus off state if the time is less than the first predetermined time interval after the second time interval has elapsed for all other bus off states after the subsequent bus off state.

3. The method according to claim 1 wherein determining whether a reset time from a time at or after the controller is reset until the subsequent bus off state is greater than a first predetermined time interval includes determining whether a reset time from when the controller is reset until the subsequent bus off state is greater than a first predetermined time interval.

4. The method according to claim 1 further comprising determining that the controller has entered a passive error state that occurs as a result of an accumulation of a second predetermined number of errors identified in messages transmitted on or received from the CAN bus, where the second predetermined number of error is less than the first predetermined number of errors, wherein determining whether a reset time from a time at or after the controller is reset until the subsequent bus off state is greater than a first predetermined time interval includes determining whether a reset time from when the controller enters the error passive state to the subsequent bus off state is greater than a first predetermined time interval.

5. The method according to claim 1 wherein the first predetermined time interval is determined to differentiate between errors cause by a faulty controller and errors caused by external electromagnetic disturbances.

6. The method according to claim 5 wherein the first predetermined time interval is about one second for a controller having a speed of about 500 Kb/s and about 10 seconds for a controller having a speed of about 33 Kb/s.

7. The method according to claim 5 wherein the second predetermined time interval is about 100 millisecond for a controller having a speed of about 500 Kb/s and about one second for a controller having a speed of about 33 Kb/s.

8. The method according to claim 1 wherein the controller is an electronic control unit (ECU) on a vehicle.

9. A method for determining when to reset an electronic control unit (ECU) on a vehicle that is part of a controller area network (CAN) in response to a bus off state that occurs as a result of an accumulation of a predetermined number of errors identified in messages transmitted on or received from a CAN bus, where the bus off state causes the ECU to be disconnected from the CAN bus, said method comprising:

determining that the ECU has entered a first bus off state;

immediately resetting the controller in response to determining that the ECU has entered the first bus off state;

setting a reset timer in response to the ECU being reset;

determining whether the ECU has entered a subsequent bus off state after the ECU has been reset;

determining whether a reset time from a time that the ECU is reset until the subsequent bus off state is greater than a first predetermined time interval, wherein the first predetermined time interval is determined to differentiate between errors cause by a faulty ECU and errors caused by external electromagnetic disturbances on the ECU;

immediately resetting the ECU in response to the subsequent bus off state if the reset time is greater than the first predetermined time interval; and resetting the ECU after a second predetermined time interval has elapsed in response to the subsequent bus off state if the reset time is less than the first predetermined time interval.

10. The method according to claim 9 further comprising setting the reset timer in response to the ECU being reset, determining whether the ECU has entered another subsequent bus off state after the ECU has been reset, determining whether the reset time from when the ECU is reset until the subsequent bus off state is greater than the first predetermined time interval, immediately resetting the ECU in response to the subsequent bus off state if the reset time is greater than the first predetermined time interval, and resetting the ECU in response to the subsequent bus off state if the time is less than the first predetermined time interval after the second time interval has elapsed for all other bus off states after the subsequent bus off state.

11. The method according to claim 10 wherein the first predetermined time interval is about one second for a controller having a speed of about 500 Kb/s and about 10 seconds for a controller having a speed of about 33 Kb/s.

12. The method according to claim 10 wherein the second predetermined time interval is about 100 millisecond for a controller having a speed of about 500 Kb/s and about one second for a controller having a speed of about 33 Kb/s.

13. A method for determining when to reset an electronic control unit (ECU) on a vehicle that is part of a controller area network (CAN) in response to a bus off state that occurs as a result of an accumulation of a first predetermined number of errors identified in messages transmitted on or received from a CAN bus, where the bus off state causes the ECU to be disconnected from the CAN bus, said method comprising:

determining that the ECU has entered a first passive error state that occurs as a result of an accumulation of a second predetermined number of errors identified in messages transmitted on or received from the CAN bus, where the second predetermined number of error is less than the first predetermined number of errors;

determining that the ECU has entered a first bus off state;

immediately resetting the ECU in response to determining that the ECU has entered the first bus off state;

setting a reset timer in response to the ECU entering a subsequent error passive state after the ECU is reset;

determining whether the ECU has entered a subsequent bus off state after the ECU has entered the error passive state;

determining whether a reset time from a time that the ECU is enters the error passive state until the subsequent bus off state is greater than a first predetermined time interval, wherein the first predetermined time interval is determined to differentiate between errors cause by a faulty ECU and errors caused by external electromagnetic disturbances on the ECU;

immediately resetting the ECU in response to the subsequent bus off state if the reset time is greater than the first predetermined time interval; and resetting the ECU after a second predetermined time interval has elapsed in response to the subsequent bus off state if the reset time is less than the first predetermined time interval.

14. The method according to claim 13 further comprising setting a reset timer in response to the ECU entering a subsequent error passive state after the ECU is reset, determining whether the ECU has entered a subsequent bus off state after the ECU has entered the error passive state, determining whether the reset time from when the ECU is reset to the error passive state until the subsequent bus off state is greater than the first predetermined time interval, immediately resetting the ECU in response to the subsequent bus off state if the reset time is greater than the first predetermined time interval, and resetting the ECU in response to the subsequent bus off state if the time is less than the first predetermined time interval after the second time interval has elapsed for all other bus off states after the subsequent bus off state.

15. The method according to claim 13 wherein the first predetermined time interval is about one second for a controller having a speed of about 500 Kb/s and about 10 seconds for a controller having a speed of about 33 Kb/s.

16. The method according to claim 13 wherein the second predetermined time interval is about 100 millisecond for a controller having a speed of about 500 Kb/s and about one second for a controller having a speed of about 33 Kb/s.

\* \* \* \* \*